United States Patent [19]

Kulbida et al.

[11] Patent Number: 5,634,089
[45] Date of Patent: May 27, 1997

[54] FULL COLOR IMAGE OUPUT TERMINAL INTERFACE

[75] Inventors: Christopher Kulbida, Fairport; Craig P. Ephraim, Pittsford, both of N.Y.; Russell R. Atkinson, Aptos, Calif.

[73] Assignee: Xerox Corporation, Stamford, Conn.

[21] Appl. No.: 538,055

[22] Filed: Oct. 2, 1995

Related U.S. Application Data

[63] Continuation of Ser. No. 880,106, May 6, 1992, abandoned.

[51] Int. Cl.$^6$ ..................... G06K 15/00
[52] U.S. Cl. ..................... 395/115; 395/109
[58] Field of Search ............... 395/115, 116, 395/164, 165, 166, 109, 114, 112, 131; 400/70; 358/540, 450, 404, 444, 462, 523, 524, 530, 538, 501, 461, 261.3; 382/245; 345/200

[56] References Cited

U.S. PATENT DOCUMENTS

| | | | |
|---|---|---|---|
| 4,353,653 | 10/1982 | Zimmerman | 400/70 |
| 4,467,363 | 8/1984 | Tench, Jr. | 358/261.1 |
| 4,646,261 | 2/1987 | Ng | 345/200 |
| 4,704,040 | 11/1987 | Takano et al. | 395/108 |
| 4,760,463 | 7/1988 | Nonoyama et al. | 358/452 |
| 4,780,709 | 10/1988 | Randall | 345/27 |
| 4,831,409 | 5/1989 | Tatara et al. | 358/524 |
| 4,887,163 | 12/1989 | Maeshima | 358/443 |
| 4,951,231 | 8/1990 | Dickinson et al. | 395/136 |
| 5,091,971 | 2/1992 | Ward et al. | 358/461 |

FOREIGN PATENT DOCUMENTS 0262801  4/1988  European Pat. Off. ....... H04N 1/387

*Primary Examiner*—Edward L. Coles, Sr.
*Assistant Examiner*—Dov Popovici
*Attorney, Agent, or Firm*—Mark Costello

[57] ABSTRACT

In an arrangement in which compressed image data including color image information is to be directed to a printer in streams of data including Sample data, Mask data, Color data and Command or instruction data, wherein the compressed data is directed along a bus, data is retrieved from the bus, with instructions from a fetcher which includes direct memory access (DMA), and is directed to several data type specific FIFO memories. A combiner, operating in accordance with instructions stored in a command FIFO, removes data from the Sample, Mask and Constant Color FIFO's in accordance with the desired image requirements as specified by Command data to form an output image.

2 Claims, 6 Drawing Sheets

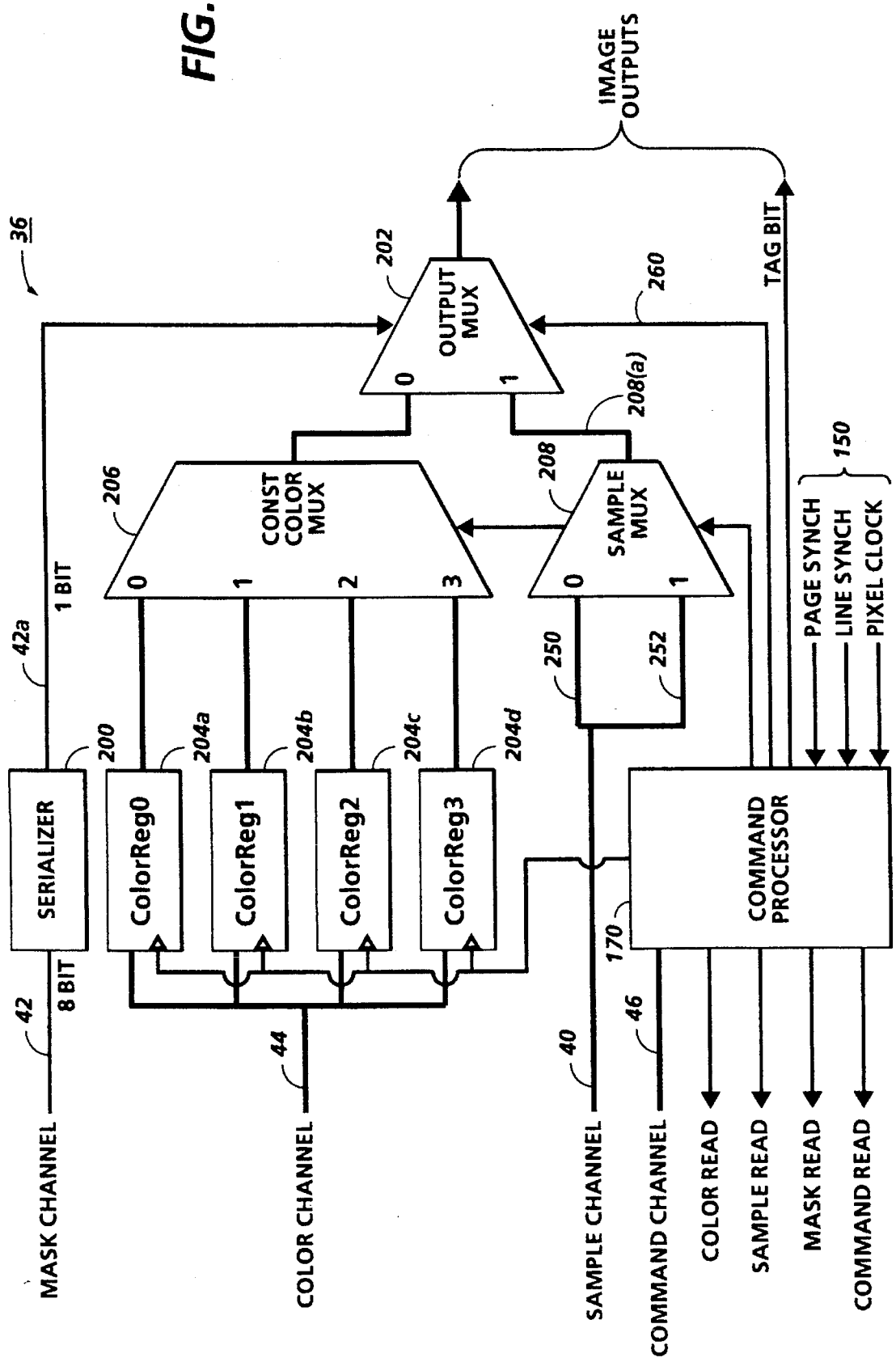

FULL COLOR IMAGE OUPUT TERMINAL INTERFACE

This is a continuation of application Ser. No. 07/880,106, filed May 6, 1992, now abandoned.

CROSS REFERENCE

Cross reference is made to U.S. patent application Ser. No. 07/696,681, entitled "Multi-Source Printer Controller", by Robert R. Buckley et al, filed May 7, 1991, and Ser. No. 07/809,807 entitled "Method and Apparatus for Controlling the Processing of Digital Image Signals", by L. Williams et al., both assigned to the same assignee as the present invention.

BACKGROUND OF THE INVENTION

The present invention is directed to methods and apparatus for decoding multiplexed, multi-type image information from a data stream, to enable printing in an optimum manner.

In U.S. patent application Ser. No. 07/696,681, a method for encoding data at a printer controller prior to printing is described. In that arrangement, all the possible combinations of line art and pictures may be synthesized using three gray or color multi-bit signals; two flat or Constant Colors in a scan picture; and two control signals; a high resolution binary Mask and a multi-bit instruction stream. A Constant Color is a color whose value is the same for all pixels, unlike the color defined by a scanned picture. A typical line art image is made up of a limited number of Constant Colors. Because color of text is usually constant or changes seldom along a scan line, a high resolution byte map of a text image on a flat color background can be synthesized from a high resolution binary Mask signal describing the filled out line of the text, and the two multi-bit Constant Color signals, describing the gray or color values of the text and of the background on which the text is set. By substituting a scanned picture signal for one of the Constant Color signals, the result is a high resolution text image overlaid on a scanned picture. Because the background for the text can be either a Constant Color or a scanned picture, an instruction would indicate which of the two it is.

Along the scan line, the system can merge these three elements: the two Constant Colors and the scan picture, selecting between them using a multiplexer under the control of the binary Mask and the instruction to produce a high resolution, multi-bit video signal which would be passed to the output device via a look up table for tone scale mapping and a register. The resulting video signal could be used to drive a gray scale display device such as a monitor, a gray scale printer, or a binary printer via halftone generator. Each of these signals could have a different spatial resolution or content along a scan line. The constant or flat colors change infrequently, although high precision is needed to specify the transitions. The scanned image has a medium spatial resolution and the binary Mask would have a high spatial resolution.

Using separate components or signals from which the final page image can be simply and easily synthesized has the advantage that the storage format can be optimized for each signal. Because the cost in colors and instructions are the same or change seldom along the scan line, they are candidates for run length encoding. The binary Mask can be stored compactly using any of the currently available binary compression algorithms, and the scanned picture can be stored using compression algorithms designed for gray scale image data.

U.S. Pat. No. 4,760,463 to Nonoyama et al. discloses an image scanner including an area designating section for designating a rectangular area on an original and a scanning mode designating section for designating an image scanning mode within and outside the rectangular area designated by the area designating section. Rectangular areas are defined by designating the coordinates of an upper left corner and a lower right corner. Subsequently, counters are used for each area boundary, to determine when the pixel being processed is within a specific area.

U.S. Pat No. 4,780,709 to Randall discloses a display processor, suitable for the display of multiple windows, in which a screen may be divided into a plurality of horizontal strips which may be a single pixel in height. Each horizontal strip is divided into one or more rectangular tiles. The tiles and strips are combined to form the viewing windows. Since the tiles may be a single pixel in width, the viewing window may be arbitrarily shaped. The individual strips are defined by a linked list of descriptors in memory, and the descriptors are updated only when the the viewing windows on the display are changed. During generation of the display, the display processor reads the descriptors and fetches and displays the data in each tile without the need to store it intermediately in bit map form.

U.S. Pat. No. 4,887,163 to Maeshima discloses an image processing apparatus having a digitizing unit capable of designating desired areas in an original image and effecting the desired image editing process inside and outside the designated areas. A desired rectangular area is defined by designating two points on the diagonal corners of the desired rectangular area. During scanning, a pair of editing memories are used interchangeably to enable, first, the editing of thresholded video data from a CCD and, second, the writing of editing information for use with subsequent video data. The editing memories comprise a memory location, one byte, for each CCD element, said location holding image editing data determining the editing process to be applied to the signal generated by the respective CCD element.

U.S. Pat. No. 4,951,231 to Dickinson et al. discloses an image display system in which image data is stored as a series of raster scan pel definition signals in a data processor system. The position and size of selected portions of an image to be displayed on a display screen can be transformed, in response to input signals received from a controlled input device. The display device includes a control program store which stores control programs for a plurality of transform operations, such as rotation, scaling, or extraction.

In the Canon CLC-500 digital color copier, introduced in 1989, provision is made to treat detected text with a high frequency halftone optimizing process, and to treat pictorial images with a low frequency halftone optimizing process.

The above-cited references are incorporated by reference for their teachings.

SUMMARY OF THE INVENTION

In accordance with the invention, with image information coded as proposed into discrete channels, several data retrieval functions become available, which utilize the coded format of the image to accomplish greater flexibility in its retrieval to image format.

In accordance with one aspect of the invention, in an arrangement in which compressed image data including color image information is to be directed to a printer in streams of data including Sample data, Mask data, color data and command or instruction data, wherein the compressed data is directed along a bus, data is retrieved from the bus, with instructions from a fetcher which includes direct memory access (DMA), and is directed to several data type specific FIFO memories. A combiner, operating in accordance with instructions stored in a command FIFO, removes data from the Sample, Mask and Constant Color FIFO's in accordance with the desired image requirements.

In accordance with another aspect of the invention, in order to economically retrieve multiple images to a single output stream, the fetcher initially retrieves an indirect Sample channel pointer, which points to a location in memory storing a Sample data starting address in system memory and the Sample data length. Sample data is fetched to the Sample FIFO from memory starting at the address specified, for the length specified. A second pointer is then fetched via DMA (direct memory access) which points to a second location in memory storing a second Sample data starting address in system memory and a second Sample data length, which may be a different image. The second Sample data is then fetched from memory starting at the address specified, for the length specified. The images are simply combined into a single document at the combiner. Thus, initially at least, the image is specified only by pointers to memory locations, and the image is not merged into a combined format until it is directed to an output.

In accordance with another aspect of the invention, the described arrangement allows use of commands on a repetitive basis, which in turn allows increased memory efficiency (i.e., few commands) in data processing. Thus, a complex command may be directed to the combiner, and stored to the command processor. On receipt of a NORMAL command, the stored command is replaced with the next command in sequence. However, on the receipt of a REPEAT command, the command stored in the command processor is reused for a number of pixels specified by the REPEAT command.

In accordance with yet another aspect of the invention, when data is identified as Sample data, defined as 32 bit per pixel data used in image areas with a great deal of color variation on a pixel by pixel basis, the page description language (PDL) in which the image is originally encoded for printing commonly identifies this data as having certain characteristics. This information is lost with the conversion of the PDL encoded document into a bitmap suitable for printing. As part of the encoding process, an additional bit or tag bit is created in the command data, which is directed to the printer independently of the image, to identify a specific printing process for the image. Thus, as the image is decoded into a single bit image for halftone printing, the characteristic image information that is available for the image is maintained, and the printer is provided with a simple instruction.

In accordance with still another aspect of the invention, multiple resolution data may be produced with a single byte of data, used multiple times. A command is sent to the command processor directing the processor to read a pixel stored on the Sample channel FIFO to the image output terminal, and then send it multiple times to the printer. Thus, the Sample channel may provide a stream of bytes to the final output multiplexer in accordance with a single command. Each byte read from the Sample FIFO's is used (made available to the final output multiplexer) for between 1 and 4 video clock cycles. The number of times a byte is used is a function of the value of a Sample channel resolution field. This allows the Sample stream in FIFO's to be used at either $1/1$, $1/2$, $1/3$ or $1/4$ of the IOT resolution.

These and other aspects of the invention will become apparent from the following descriptions used to illustrate an embodiment of the invention read in conjunction with the accompanying drawings in which:

FIG. 3 is a block diagram illustrating the architecture for the combiner;

As used herein, the output of the system is an image suitable for a variety of image output devices, including printers which produce binary (ON or OFF, black or white) or gray scale (multiple bit or multiple density level) images, and displays. When the output is referred to as a document, for the purposes of this description, the term is synonymous with display, and vice versa. As used herein Mask data refers to single bit per pixel data which is generally used in image areas where high resolution and detail are present. Constant Color data is 32 bit per pixel data (8 bits per color times 4 colors or separations per pixel for process color (cyan, magenta, yellow, black)) which is loaded once and repeatedly used by the system for a large number of pixels. Sample data refers to 32 bit per pixel data (as above) which is used in image areas with a great deal of color variation on a pixel by pixel basis. Images are sets of image data or pixels, each pixel representing the optical density of the image at a discrete location therein. Images may be generated by scanning an original, or through a computer graphics process. Command data refers to 16 bit commands, which relate to the three channels of image data, and are available to instruct the combiner in the appropriate combination of the image data to create the output. The different image data type data and command data are produced from an original image, as described by U.S. patent application Ser. No. 07/696,681, entitled "Multi-Source Printer Controller", by Robert R. Buckley et al, filed May 7, 1991, and assigned to the same assignee as the present invention, specifically incorporated herein by reference.

Figure 1:
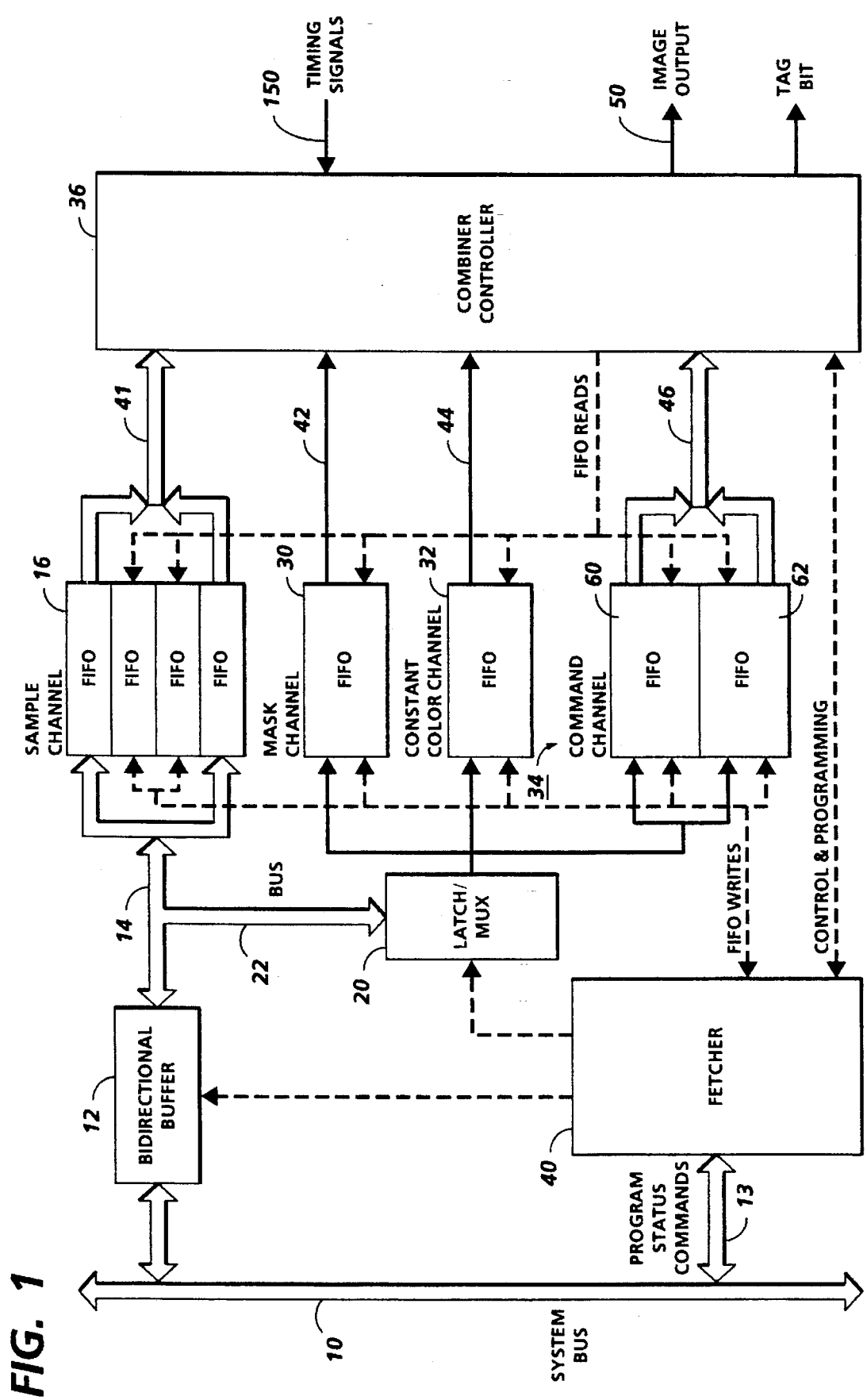
FIG. 1 is a block diagram showing the architecture for system for carrying out the present invention.

With reference now to the drawings where the showings are for the purpose of illustrating an embodiment of the invention and not limiting same, in FIG. 1, compressed and encoded image data from previously derived images is passed along image command and data or system bus 10, which may be a data transferring bus in a source of image and command data, such as the SBus or system bus in a Sun SPARC station, produced by Sun Microsystems, Inc., of Mountain View, Calif. Data representing the image in 32-bit words is directed to bi-directional buffer 12, by DMA fetching which temporarily stores data before passing it to image and command data bus 14. Image and command data bus 14 directs data along a 16 bit path to the Sample FIFO (First In/First Out) memory 16 and to a combination latch and multiplexer 20, along multiplexer bus 22. Data from combination latch and multiplexer 20 is directed in 8-bit paths to the Mask FIFO memory 30, Constant Color FIFO memory 32, and command FIFO memory 34. Each FIFO is part of a data path for each data type that is referred to as a "channel". Data from Sample FIFO 16, Mask FIFO 30, color FIFO 32, and command FIFO 34 (as a group, the FIFO set) is directed to the combiner controller 36, via image data lines 41, 42, 44 and 46 respectively. Combiner controller 36 selects data from each of the image FIFO's in accordance with instructions from command FIFO 34 to form 8-bit output image data, which it directs to an IOT, via image output 50. Combiner controller 36 directs pixels to output 50 in accordance with timing signals (e.g., pixel clock, line and page synchs) received from the IOT (image output terminal).

Combiner controller 36 reads the data structures from FIFO's 16, 30, 32, and 34, and in accordance with commands from the command FIFO 34, combines the image data from FIFO's 16, 30, 32 into an 8-bit per pixel IOT resolution color separation. Combiner controller 36 is, in essence, a large multiplexer that utilizes the commands from command FIFO 34 to select data from the Sample channel, Constant Color channel and Mask channel to produce one 8-bit video pixel for each pixel in the printable image.

The system bus 10 is also connected to fetcher 40 for programming, status and control functions. Fetcher 40 is a four channel controller with a channel assigned to each of the data structures, Sample data, Mask data, color data, and command data. A fifth channel, referred to as the Sample Pointer channel, is also provided and will be discussed hereinafter. Fetcher 40 designates which image data should be taken out of system memory and written to the FIFO set. Other fetcher functions include responding to CPU accesses to the serial communications controller used for communicating command and status information with the IOT. Fetcher 40 also responds to CPU accesses to configure combiner controller 36 readback data structures via a diagnostic readback path, and the FIFO memories almost full flag offset registers. While image data might be directed through fetcher 40, in the present embodiment, fetcher 40 controls bidirectional data buffer 12 to write image data to the FIFO set from bus 10.

In the case of the Sample channel, a 32-bit word is fetched from system memory along image data and command bus 10, passed through data buffer 12, and is written directly into the Sample FIFO's, one byte per FIFO. In the case of a quad-word burst, a word of data can be written into the FIFO's on each of four consecutive clock cycles. Fetcher 40 provides control for data buffer 12, as well as the writing to the four Sample FIFO's. In the case of the slow speed channels (Constant Color Mask and Command channels), the FIFO width is less than 32-bits, due to the inherent lower bandwidth on these channels, and the need to conserve space based on the physical requirements placed on the image bus hardware chosen). Hence, fetcher 40 provides control to latch a 32-bit word in off-chip latches/multiplexer 20 and to multiplex the data into four bytes. In the case of the Mask and Constant Color Channels, FIFO's 30 and 32 are byte-wide. Hence, all four bytes of the 32-bit word are written into the same FIFO, one at a time on four consecutive clock cycles. In the case of the Command channel, two FIFO's 60, 62 are used for a width of 16-bits. The first byte is written to the fist FIFO, the second byte to the second FIFO, the third byte to the first FIFO, and the fourth byte to the second FIFO in a ping-pong approach. Writing of the current four bytes of data into the slow speed channel FIFO's is performed at the same time as the fetching and latching of the next word of data. No extra cycles are used in performing the multiplexing operation.

The described architecture is conveniently arranged on a single circuit board, with the fetcher and combiner each implemented in ASIC circuitry, such as provided by the Xilinx 3090 100 and the Xilinx 3064 100, respectively, both products of the Xilinx Inc.

Figure 2:
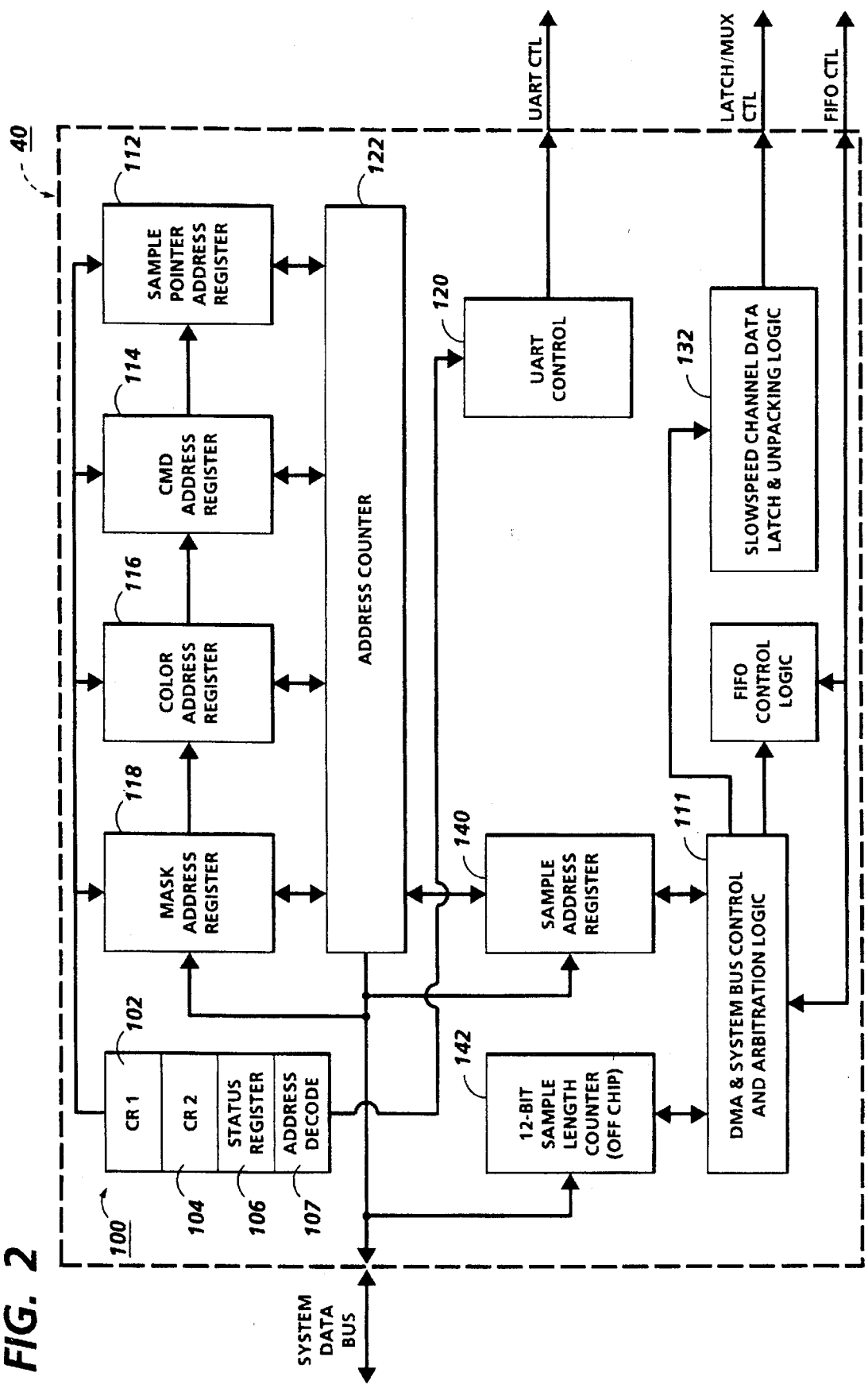
FIG. 2 is a block diagram illustrating the architecture for the fetcher.

FIG. 2 illustrates fetcher 40 architecture. Generally, fetcher 40 is the means by which image data and commands are retrieved from the system memory and stored to the FIFO set. Fetcher 40 combines at block 100, two 8-bit control registers 102 and 104 and an 8-bit status register 106 and an address decoder 107. These registers are accessed as 32-bit image bus locations with data bits 24 to 31 containing significant data, and were designed as individual 8-bit registers (as opposed to one larger register) to avoid the need for multiplexing their outputs with the outputs of the 24-bit DMA address registers (112, 114, 116, 118, 140). The first control register CR1 (102) contains the DMA enable bit which, once set, and when the DMA address registers have been initialized correctly, allows fetcher 40 to begin fetching data. The DMA is disabled whenever this bit is cleared. Two separate reset bits are contained in CR1: a board reset and a UART reset. The UART (Universal Asynchronous Receiver/Transmitter) reset resets the UART, while the board reset clears the FIFO's and initializes registers in the combiner controller 36 (FIG. 3) and Fetcher 40. The second control register CR2 (104) contains the individual interrupt Mask bits and the master interrupt enable. Each potential interrupting source can be masked off or enabled by its Mask bit. The master interrupt Enable was included to eliminate any potential race conditions. Status register 106 contains the bits which reflect the state of all the interrupting sources on the board.

Software control will write to the CR1 register 102 to set the board. These bits must be written with O's to clear the reset conditions. The Sample Pointer address register 112, Command Address register 114, Constant Color Address register 116, and Mask Address register 118 are then loaded with appropriate 24-bit addresses (where the two low order bits are always driven as 0's) representing starting points for each data type in memory. The registers are loaded in the sequence listed, as the implementation chains the registers along to conserve routing.

Once the address registers 112, 114, 116 and 118 are loaded, the UART (universal asynchronous receiver/transmitter) controller (not shown) can be initialized, if desired. Fetcher 40 provides all of the control logic to write or read UART registers via UART control 120.

Fetcher 40 also provides the control necessary for programming some initialization registers in combiner controller 36. Some of the programmable characteristics include write white/write black, and page synchronization signal active high/low.

With reference now to FIG. 2, once the registers are loaded and controls initialized, the DMA Enable bit in CR1 register 102 can be set. This starts the fetcher's DMA and system bus control and arbitration logic 111 which latches the state of each of the DMA channel FIFO's almost-full flag and immediately determines that the Sample Length count is equal to zero and that a new Sample Length and Sample Address need to be fetched via the Sample Pointer Channel. Hence, the fetcher 40 drives a Bus Request signal active and simultaneously enables the outputs of the Sample Pointer Address register. As soon as the bus grant signal is recognized, the virtual address for the Sample Pointer channel is driven for one cycle.

Simultaneously, the Sample pointer address is latched into the 22-bit Address Counter 122. Address Counter 122 is only 22-bits wide and increments address bits 2–23. Since only word (or quad-word) DMA transfers are performed, address bits 0 and 1 are always 0. Similarly, address bits 24–31 are constant. Two cycles after the address is latched in the Address Counter, it is incremented by one (or by four, in the case of a quad-word transfer).

When a word acknowledge is driven by the bus controller (not shown) to fetcher 40, several things occur. Since this is an indication of a successful transfer, the incremented address can now be written back into the appropriate address register. Additionally, a state machine provided within the slow speed channel data latch and unpacking logic 132, that controls the latching of the data, is initiated. In the case of the Sample Address, being fetched pursuant to identification at Sample Pointer address register 112, the Sample Address is latched into the Sample Address Register 140 on chip.

While the arbitration scheme used by fetcher 40 for arbitrating among the four channels is a round robin approach, the Sample Pointer Channel always has highest priority to reflect the fact that the Sample Channel has the highest data rate. If the Sample Length counter value, stored in 12 bit Sample length counter 142 (off chip), decrements to zero, a new Sample Address and Sample Length are fetched in accordance with the Sample pointer value at address register 112 during the next available bus cycle via the Sample Pointer Channel. If the Sample Length is non-zero, then each of the four data channels are serviced sequentially based on their need for data.

Figure 4A:
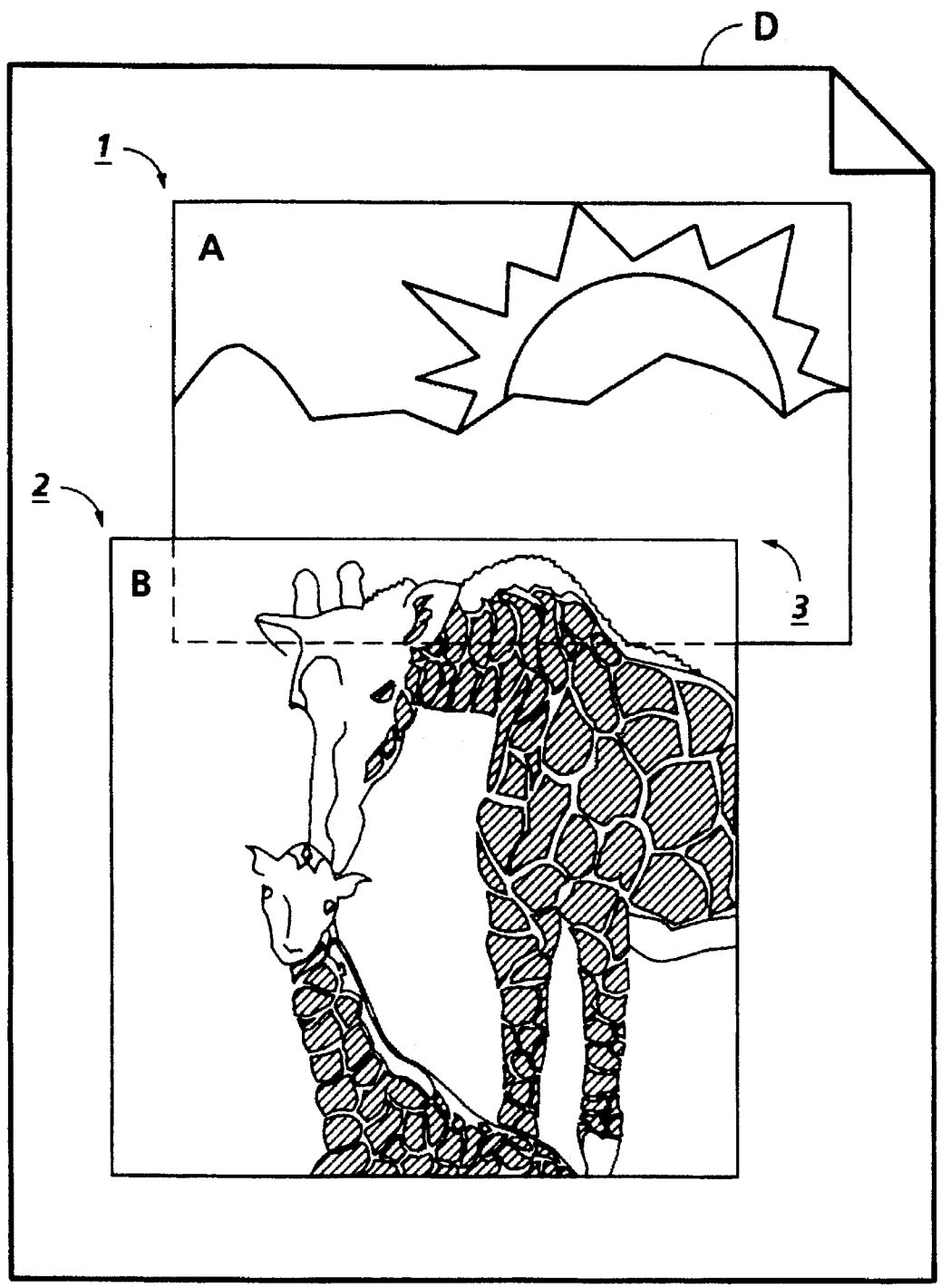
FIGS. 4A and 4B illustrate the use of the indirect Sample channel pointer.
Figure 4B:
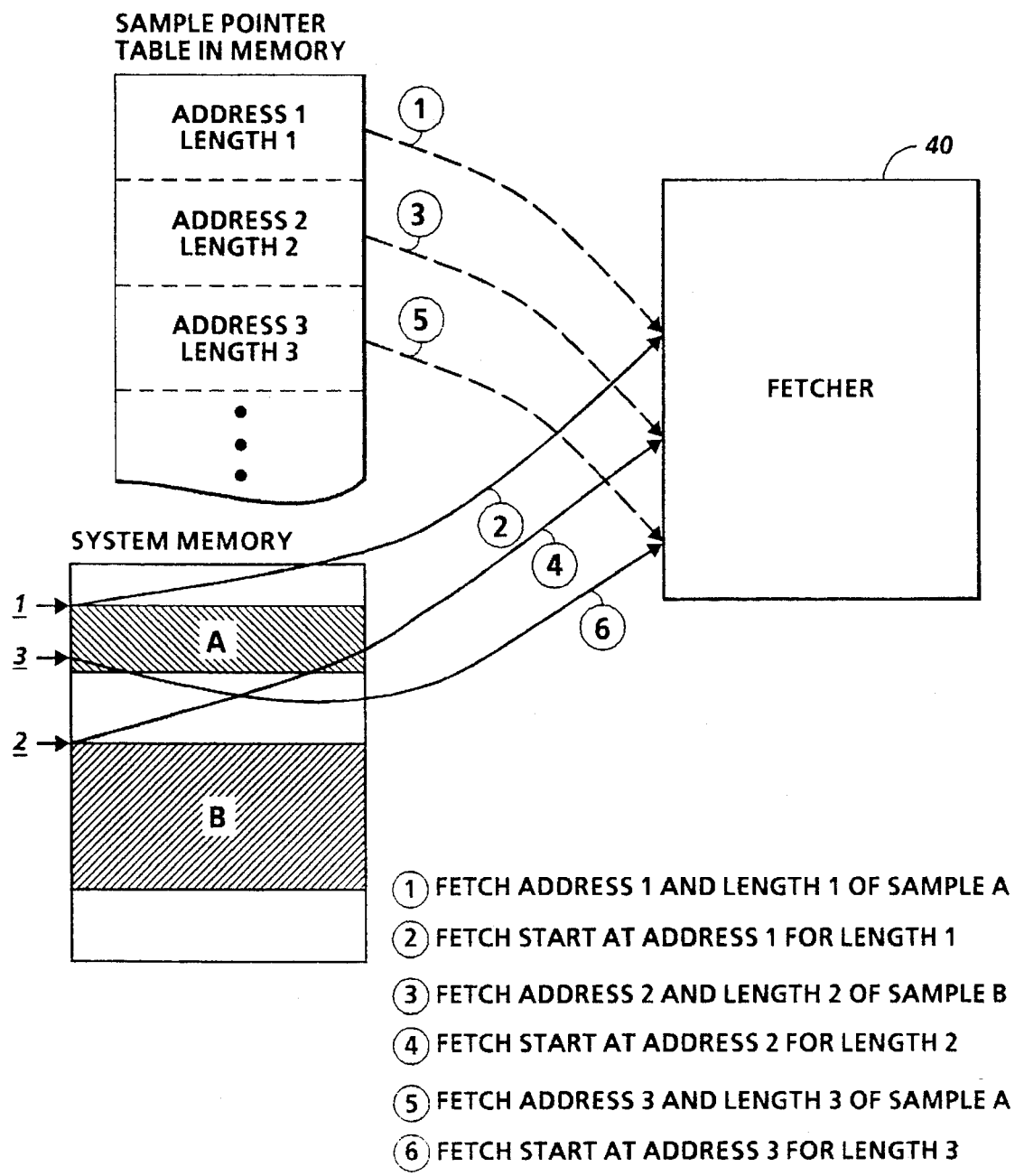

In accordance with one aspect of the invention, and with reference now to FIGS. 4A and 4B, the present apparatus enables the more efficient use of memory reads. With reference initially to FIG. 4A, Images A and B are stored in a system memory, but are desired to be printed in the form of document D in overlapping positions on a single page. Commonly, this is done by forming a new byte map, which represents the combination of A and B, therefore requiring the covered portion of image A to be deleted.

The advantages of this method are several. First, it eliminates the need for the typical CPU intervention with DMA interrupts—task switching, I/O control by the CPU to update the address and length, etc. allowing the CPU to continue processing other data.

Secondly, it provides an efficient means for handling cases where images contain multiple Sample blocks of data in the same scan line that may be separated by non-Sample data, or images which contain overlapping Sample blocks. By implementing this level of indirection, the Sample Pointer Channel can be used to switch between these blocks of Sample data without requiring the data to be concatenated and/or overlaid based on "on-topness" on a scan line basis, in system memory. Individual Sample byte maps can be placed in separate memory spaces as they are imaged, and reside in those separate memory spaces until accessed by the Fetcher, at which time the "on-topness" is implemented in real time.

Lastly, the Sample Pointer is used as an efficient means of reducing memory requirements in the case where images contain the same Sample byte map several times within an image. In this case, the Sample byte map need only reside in system memory once. The Sample Pointer Channel can then be used to direct the Sample Channel to fetch data from that same location as many times as required. Similarly, the Sample Pointer channel can be used to enable scanline replication in cases where realtime image scaling is desired. While the Combiner is used to perform pixel replication, the Sample Pointer channel performs the scanline replication. This method does not require the scaled image to reside in system memory, thus reducing memory costs.

In the present arrangement, and with reference now to FIGS. 2 and 4B, for a document to be constructed such as document D, a pointer table (the Sample Pointer Table) containing Sample address and Sample length pairs is created by software and stored in system memory prior to printing. The Sample address identifies the starting point of the current Sample block of data, while the Sample length identifies the amount of data to be fetched starting from that address. Upon initialization of fetcher 40, the address of the beginning of the Sample Pointer Table is stored to the Sample Pointer Address Register 112. When DMA 111 is enabled, fetcher 40 fetches (via DMA) from the Sample Pointer Address, the Sample address and Sample length to the Sample Address Register 140 and the Sample length counter 142, respectively. Fetcher 40 fetches Sample data from the first block of identified data until the Sample length counter decrements to zero. Upon detection of the Sample length having decremented to zero, Fetcher 40 fetches (via DMA) another Sample address and Sample length from the Sample Pointer Table in memory.

Thus, the operations, illustrated at FIG. 4B looks like:

1) Fetch Address 1 and Length 1 of Sample A via Sample pointer Channel
2) Fetch starting at Address 1 for Length 1 (decrement length counter to 0) via Sample Channel
3) Fetch Address 2 and Length 2 of Sample B via Sample pointer Channel
4) Fetch starting at Address 2 for Length 2 (decrement length counter to 0) via Sample Channel
5) Fetch Address 3 and Length 3 of Sample A via Sample pointer Channel
6) Fetch starting at Address 3 for Length 3 (decrement length counter to 0) via Sample Channel After the Sample Channel is serviced once, the Mask Channel is serviced if its latched FIFO almost-full flag indicates the need for data. As mentioned, since the Mask Channel only uses one byte-wide FIFO, the 32-bit word that is fetched is latched in external latches and then multiplexed into bytes. The multiplexing and writing of the bytes into the FIFO is performed during the fetching of the next word of data. The operation of the Color Channel is identical. Last to be serviced before arbitration occurs again is the Command Channel. Again, since this channel is only 16-bits wide, the data is latched and multiplexed appropriately into the two FIFO's.

After each channel has been serviced, its respective DMA request is negated. When all DMA requests have been negated, arbitration reoccurs. The sequence for servicing the channels begins all over again with the Sample Channel. Note that if no channel requires data (all FIFO's are "full" or stopped), the Fetcher continues to arbitrate until either a channel does require data or the DMA Enable bit is cleared in CR1. Also note that arbitration only requires one additional cycle.

With reference now to FIGS. 1 and 3, at FIG. 3, a block diagram is shown illustrating combiner controller 36. Video generation is started whenever a valid line sync signal (LSYNC) is received along line 150 from the image output terminal (IOT) (not shown). A valid edge of the line sync causes both a command byte to be read from line 46 from command FIFO 34 and a Mask byte to be read from line 42 from Mask FIFO 30. From that point until the end of the scan line, a Mask byte is read every 8 video clock cycles and a Mask bit is available for use with every pixel that is output from combiner 36. Once a command is read into the command processor 170, it is decoded and may do any of the following: it may request that a Constant Color be read at the next cycle, it may require that a Sample byte become available within two cycles, and it may specify how the Sample, Constant Color, and Mask data currently in the device is combined to form an output pixel. During each clock cycle, the currently active command is decoded and the control signals necessary to generate that pixel follow the Mask, Color, and Sample data down the pipeline until the final output byte is produced at the output of the combinet processor 36.

Combiner processor 36 includes the following as illustrated in FIG. 3. The Mask channel serializer 200 independently reads the 8-bit Mask data from line 42 and provides a single bit Mask bit to the output multiplexer 202 every video clock cycle. This bit may or may not be used, depending on what the currently active command specifies. Color registers 204a, 204b, 204c, and 204d store up to four Constant Colors that may be used and reloaded throughout the document, as will be discussed further hereinafter. The Constant Color multiplexer 206 selects which of the four Constant Colors loaded in the registers is to be used for a video output byte. The currently active command specifies which Constant Color is to be used.

Sample multiplexer 208 allows 16 to 8-bit unpacking of the Sample data on line 40 and provides one bit of output to the output multiplexer 202. Output multiplexer 202 selects whether the output video data is a Constant Color or a Sample byte. Command processor 170 incorporates a run length counter which insures that a command is active for the number of video clock cycles in its embedded count as well as a command decoder which sets up the various multiplexers to generate the proper data byte at each clock cycle.

The command channel data on line 46 begins as a 16 bit word at the output of FIFO's 60, 62. Both of FIFO's 60, 62 read signals are tied together and driven by a command processor 170 (which also provides FIFO control for reading to the combiner) to periodically store a command to command register 172. The processing of the command channel is different from the other channels due to the fact that the two different kind of commands control the output multiplexer 202 in distinctly different ways.

The Sample channel data path begins as 2×16 bit FIFO outputs at the output of 4 synchronous FIFO's, which are selectively enabled onto the 16 bit combiner input bus 41. All four of the FIFO Read signals are tied together, and driven by a signal, indicated by the Sample FIFO read signals driven by Command Processor 170. Once at combiner controller 36, the 16 bit Sample bus 40 is split into two 8 bit buses, 250,252. These are both fed into Sample multiplexer 208 which provides the second level of 16 to 8 bit byte unpacking.

The currently available Sample byte (along with the current Constant Color byte) is now available to the output multiplexer 202. That multiplexer decides whether the next video output byte will come from the Sample channel or the Constant Color channel, controlled by signals from the command processor along line 260 and the current Mask bit, delayed by enough cycles to correspond with the data it is destined to control.

Figure 5:
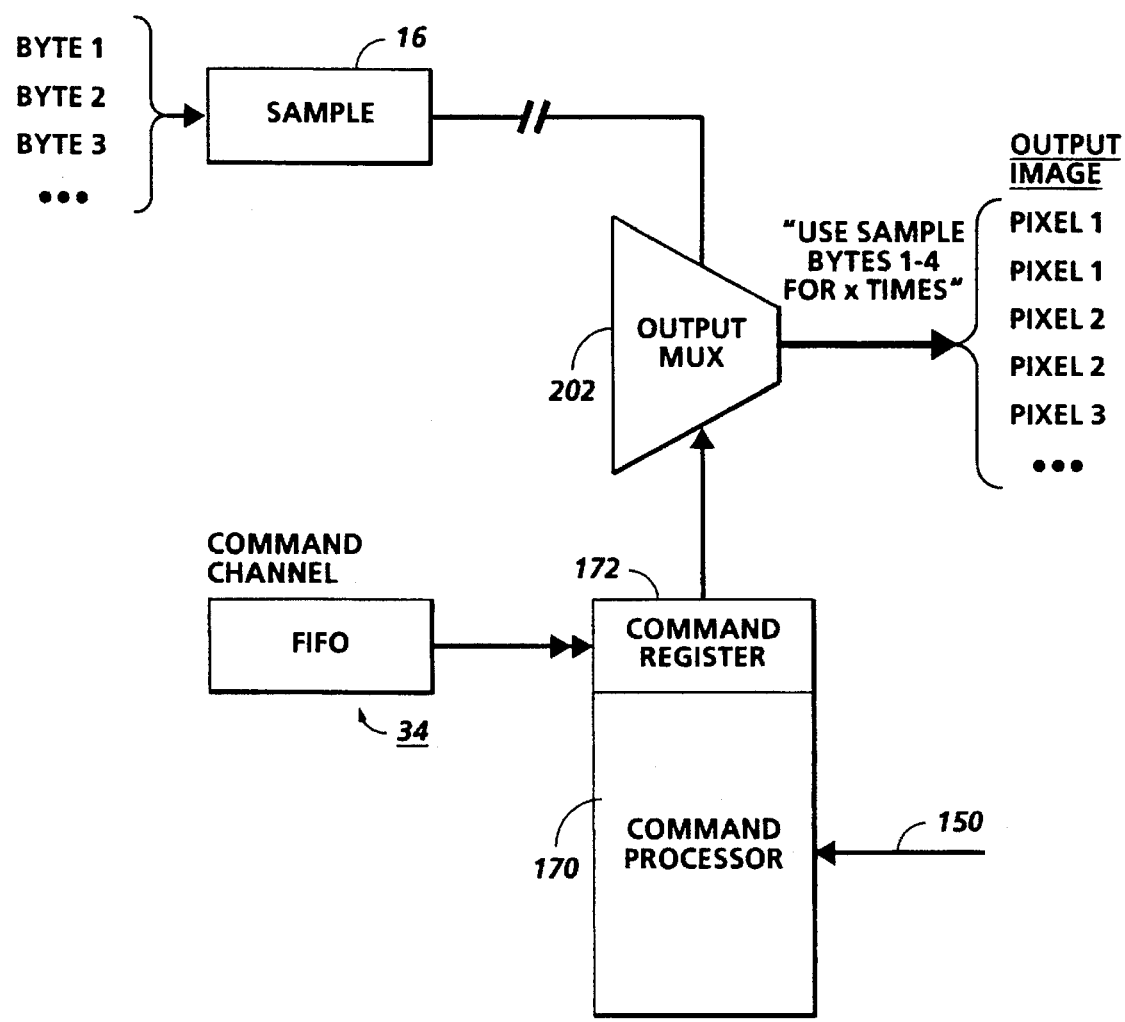
FIG. 5 illustrates production of multiple resolutions of an images by repeating data.

In accordance with the invention, and with reference to FIG. 5, the Sample channel will provide a stream of bytes to the final output multiplexer in accordance with a single command. Each byte (representing pixels 1, 2, 3, etc.) read from the Sample FIFO's 16 is used (made available to the final output multiplexer) for between 1 and 4 video clock cycles. The number of times a byte is used is a function of the value of a Sample channel resolution field of the current command stored to the command register. The Command stored at the command register instructs output makes available a single byte from the Sample Channel FIFO at output 208a of Sample multiplexer 208. This allows the Sample stream in FIFO's 16 to be used at either $\frac{1}{1}$, $\frac{1}{2}$, $\frac{1}{3}$ or $\frac{1}{4}$ of the IOT resolution. This is independent of the 32 to 8 byte unpacking described earlier.

In accordance with another aspect of the invention, to support a continuous tone optimized halftoning method in the IOT, a 9th bit or Tag bit is provided along with the video output data. This bit is high whenever the Sample channel is selected and provides an instruction to IOT hardware regarding which screening method is to be used. The page description language interpreter, in processing an image created or encoded in a page description language, identifies certain areas of the output image as being sample data, which can be halftoned differently from the line art, solid colored, and text parts of the image, to improve the appearance. This information is typically lost with the conversion of the PDL encoded document into a bitmap suitable for printing. However, due to the separation of the different data types, inherent in the encoding of an image into Sample, Constant Color, Mask and Command data types, that distinction is preserved until the image is printed. When Combiner controller 36 is instructed to create the printable image, the fact that sample data is being printed is indicated to the IOT through the tag bit along line 152 (TAGBIT). This information allows the IOT to select an internal halftone screen best suited to the data type (in this case, sample data) being printed, resulting in an improved document appearance. Characteristic image information that is available for the image is maintained, and the printer is provided with a simple instruction to implement IOT based processing on the basis of such information.

At the start of a page or separation being imaged, and upon receiving the first command that requires Sample data, a 32 bit word is read from the Sample FIFO 16, since a Sample byte is needed. The most significant byte of that word is steered through both a tri-state multiplexer outside the combiner which selects which 16 bit word to use, and a multiplexer inside the combiner that selects which byte to use. That byte is provided to the final output and makes available a single byte from the sample. When the 1 to 4 cycles is up, the unpacker is directed to provide a new Sample byte. It may offer the next byte in the current word, or if necessary, the first byte in a newly fetched word.

In accordance with another aspect of the invention, and with reference to FIG. 3, the described embodiment allows the storage of up to 4 different Constant Colors in color registers 204a, 204b, 204c, 204d (a four entry palette), that may be used and reloaded as required throughout the document. The Constant Color multiplexer 206 selects which of the four Constant Colors loaded in the registers is to be used for a video output byte. The currently active command (stored at command processor 170) specifies which Constant Color is to be used. Rather than requiring the use of a new "load color" command whenever a color is needed, certain colors are stored at the color palette, to be called as required, without calling new colors from the FIFO's. In business graphics applications, where the number of colors is likely to be limited, the colors used can be stored at the Constant Color FIFO, and called as required without repeating the read command to reduce required. Thus, the number of constant colors stored in system memory is reduced perhaps from one for each pixel to a number close to the number of colors in an image, and bandwidth consuming system memory accesses are reduced. This concept is upwardly extensible to more than 4 registers, although, as studies show that in common business graphics only about 8 colors are commonly used. Four colors therefore represents a reasonable limitation on the number of memory calls that will be required.

The notion of End Of Line and End Of Page is also made part of the command set at the command FIFO, in order to decouple the imaging software and IOT, in that the imaging software does not have to know the exact size of the byte map that will eventually be sent to the IOT, since the IOT is no longer in the position of demanding a certain number of bytes, but instead, taking what the output controller provides.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A method of reproducing a color image in a printer, with a printer output controller, including the steps of:

receiving image data from an image data source, said image data defined in terms of pixels including a discrete color image information component representing a first color for a pixel and command information;

storing said discrete color image information into a first color image information latch, said color image information latch receiving data from said image data source corresponding to a color for a pixel, and outputting image information to an image device;

storing said command information received from said image data source into a command information latch;

responsive to said command information stored in said command information latch, repetitively causing said color image information latch to output the same color image information for a plurality of pixels for a predetermined number of times prior to receiving new image information in regions of repetitive color image information content, whereby regions of identically colored pixels may be generated for output to said printer with a single receipt of color image information per color wherein for a second color, said image data is received to a second latch; and wherein for an image conmposed of nonadjacent regions of said first and second colors, said image information is output from each of said first and second latches, with only said single receipt of color image information per color.

2. A method of reproducing a color image in a printer, with a printer output controller, including the steps of:

receiving image data from an image data source, said image data defined in terms of pixels including a discrete color image information component representing a first color for a pixel and command information;

storing said discrete color image information into a first color image information latch, said color image information latch receiving data from said image data source corresponding to a color for a pixel, and outputting image information to an image output device;

storing said command information received from said image data source into a command information latch;

responsive to said command information stored in said command information latch, repetitively causing said color image information latch to output the same color image information for a plurality of pixels for a predetermined number of times prior to receiving new image information in regions of repetitive color image information content, whereby regions of identically colored pixels may be generated for output to said printer with a single receipt of color image information per color;

wherein regions of identically colored pixels generated for output to said printer with said single receipt of color image information per color for printing with said first color are non adjacent.

* * * * *